United States Patent
Desmond et al.

(10) Patent No.: US 11,573,108 B2
(45) Date of Patent: Feb. 7, 2023

(54) ESTIMATES OF FLOW VELOCITY WITH CONTROLLED SPATIO-TEMPORAL VARIATIONS IN CONTRAST MEDIA PROPERTIES

(71) Applicant: ExxonMobil Technology and Engineering Company, Annandale, NJ (US)

(72) Inventors: Kenneth W. Desmond, Nazareth, PA (US); Gary L. Hunter, Stewartsville, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 418 days.

(21) Appl. No.: 16/782,398

(22) Filed: Feb. 5, 2020

(65) Prior Publication Data
US 2020/0271498 A1 Aug. 27, 2020

Related U.S. Application Data

(60) Provisional application No. 62/808,450, filed on Feb. 21, 2019.

(51) Int. Cl.
*G01F 1/7084* (2022.01)
*G01F 1/7088* (2022.01)
(Continued)

(52) U.S. Cl.
CPC .......... *G01F 1/7084* (2013.01); *G01F 1/7042* (2013.01); *G01F 1/7044* (2013.01);
(Continued)

(58) Field of Classification Search
CPC .... G01F 1/7042; G01F 1/7044; G01F 1/7046; G01F 1/7048
See application file for complete search history.

(56) References Cited

U.S. PATENT DOCUMENTS

| | | | |
|---|---|---|---|
| 2,841,713 A | * | 7/1958 | Howard ................ G01F 1/7042 250/303 |
| 4,545,244 A | | 10/1985 | Yasuda et al. |

(Continued)

OTHER PUBLICATIONS

R. Velmurugan et al., Ultrasonic Flowmeter Using Cross-Correlation Technique, International Journal of Computer Applications, Mar. 2013, vol. 66, No. 10, pp. 19-22.
(Continued)

*Primary Examiner* — Paul M. West
(74) *Attorney, Agent, or Firm* — Vorys, Sater, Seymour and Pease LLP

(57) ABSTRACT

Provided herein are improved methods for estimating the flow velocity of a fluid in a vessel. Systems and methods are provided herein related to making and/or refining velocity measurements for flowing fluids, both single and multi-phase fluids, in vessels, such as pipes or conduits, utilizing contrast media property agent variations. In one aspect, this disclosure provides a method of determining a flow velocity of a fluid flow in a vessel including: providing a fluid flow having contrast media, the contrast media having a contrast media property variation; providing a detectable signal corresponding to the contrast media property variation; collecting the detectable signal at an upstream receiver to produce a first received signal; collecting the detectable signal at a downstream receiver to produce a second received signal, the downstream receiver being located downstream of the upstream receiver at a distance (L); filtering the first received signal and the second received signal through a contrast media variant filter to produce a first filtered signal and a second filtered signal; cross-correlating the first filtered signal and the second filtered signal to determine a time shift ($\Delta t$) between the first filtered signal and the second filtered signal; and estimating the velocity of the fluid flow using this relationship vflow=L/$\Delta t$.

22 Claims, 5 Drawing Sheets

(51) Int. Cl.
  *G01F 1/704* (2006.01)
  *G01F 1/7082* (2022.01)
  *G01F 1/712* (2006.01)

(52) U.S. Cl.
  CPC .......... *G01F 1/7046* (2013.01); *G01F 1/7048* (2013.01); *G01F 1/7088* (2013.01); *G01F 1/7082* (2013.01); *G01F 1/712* (2013.01)

(56) References Cited

U.S. PATENT DOCUMENTS

| | | | |
|---|---|---|---|
| 4,876,056 A * | 10/1989 | Clayton | G01P 5/006 250/303 |
| 5,047,632 A * | 9/1991 | Hunt | E21B 27/02 250/303 |
| 2013/0219986 A1* | 8/2013 | Laukkanen | G01F 25/12 73/1.24 |
| 2013/0238260 A1 | 9/2013 | Fukuhara et al. | |
| 2014/0096599 A1 | 4/2014 | Munch et al. | |
| 2014/0305215 A1* | 10/2014 | Dabak | G01F 1/667 73/861.28 |

OTHER PUBLICATIONS

Worch, "A clamp-on ultrasonic cross correlation flow meter for one-phase flow," Measurement Science and Technology, 1998, vol. 9, pp. 622-630.

\* cited by examiner

ESTIMATES OF FLOW VELOCITY WITH CONTROLLED SPATIO-TEMPORAL VARIATIONS IN CONTRAST MEDIA PROPERTIES

CROSS-REFERENCE TO RELATED APPLICATIONS

This application claims the benefit of U.S. Provisional Application No. 62/808,450, filed on Feb. 21, 2019, the disclosure of which is incorporated herein by reference in its entirety.

FIELD OF THE INVENTION

Systems and methods are provided herein related to making and/or refining velocity measurements for flowing fluids, both single and multi-phase fluids, in vessels, such as pipes or conduits, utilizing an improved cross-correlation method attuned to contrast media property agent variations.

BACKGROUND OF THE INVENTION

Real-time production optimization requires measurements of fluid flows from individual wells or different zones within a well. Attempting to measure and/or estimate the flow velocity of a fluid flow using a simple, non-intrusive method can pose a variety of challenges and complications.

Multi-phase fluids, for instance, often have a continuous phase and a discontinuous phase; components in the discontinuous phase can complicate accurate flow measurements for the multi-phase fluid because they have contrasting properties to the continuous phases of the fluids. These contrasting properties can create noise within the measurements, making those fluid flow measurements inaccurate, especially if not filtered out correctly, preferably without interference from the testing mechanisms. Even single-phase fluids can be subject to such noise that complicates flow measurements due to the inclusion of various components in the fluid.

Many methods of measuring fluid flow in a vessel have drawbacks. For instance, some involve diverting flow from a designated vessel for testing. Such diversion methods often involve waiting multiple weeks or months between characterization events and can present difficulties when attempting to optimize fluid flow. Another method involves installing commercially available flow meters in the vessels, but most are often inaccurate when compared to direct measurements and require an inordinate amount of time and effort for the installation. Still other alternatives for determining a flow velocity can be based on methods that involve substantial training for the operator and/or specialized equipment that is typically more suited for laboratory use (e.g., nuclear magnetic resonance (NMR) imaging or gamma ray imaging).

Another method that can be used to measure fluid flow is a cross-correlation method, which estimates the velocity of contrast media in a given fluid flow. A traditional cross-correlation technique requires a signal emanating from suspended or dissolved material within the continuous phase to be measured by two receivers placed within the fluid flow, or external to a vessel containing the fluid flow, for the purposes of measuring the continuous phase flow velocity at those receivers. For purposes herein, the term "signal(s)" refers to acoustic, electromagnetic, or radioactive signals, and the source of such signals could be either passive or actively induced. In traditional cross-correlation methods, the receivers can be positioned such that there are two receivers that both record emanating signals over some amount of time. The signal a receiver measures entirely depends on the relative spatial position between the contrast media within the flow and the position of the receiver. Therefore, in situations where the two receivers are placed within a sufficient distance from another such that the flow does not significantly alter the configuration of the contrasting media, then the two receivers should observe signals similar signals, albeit separated in time from each other. Flow velocity can then be estimated using a traditional "cross-correlation" method, known to those skilled in the art, which estimates the velocity of contrast media entrained in the flow through an analysis of an upstream signal and a downstream signal in a fluid flow and then determining a time shift ("τ") by cross-correlating the upstream signal with the downstream signal, wherein the downstream received signal has been shifted by some amount of time ("Δt"). By measuring the time shift, τ, between the two receivers, the flow velocity can be determined using the expression $v_{flow}=L/\tau$.

Although relatively easy to implement, this cross-correlation method is prone to error when used to estimate the flow velocity of a continuous phase in a multi-phase fluid because the technique is sensitive to the velocity of entrained contrast media in the fluid flow, especially when such contrast media move at a different velocity than the continuous phase of the fluid. Consider a couple of examples to highlight potential short-comings of the technique. Both examples comprise active acoustic sources and the contrasting media is either sand or air bubbles within the flow, which necessarily have different sizes and other characteristics that affect their flow within the fluid flow. In either case, the value of τ measures the time it takes the sand grains or air bubbles entrained in the fluid flow to move from an upstream receiver to a downstream receiver. For instance, in a vertical flow involving centimeter sized air bubbles, the air bubbles can move at velocities 10 times that of the continuous phase flow velocity. In a horizontal flow involving sand, the sand can settle near the bottom of the pipe and swirl, and on average, have velocities much slower than the continuous phase flow velocity. If the signals focus on either of these, the calculated flow rate is flawed because the contrast media do not flow at the same rate as the continuous phase.

Where the cross correlation technique is able to accurately measure the flow velocity of the continuous phase is when the contrast media moves at the same velocity as the continuous phase. However, if some of the contrast media have the same velocity as the continuous phase and other contrasting media (also present in the flow) have different velocities, then errors may occur. Consider the prior example of air bubbles entrained in a vertical flow, where in this case both small and large air bubbles are present. For very small air bubbles (microns in size) they will move at the velocity of the continuous phase, but large air bubbles will not. In cases where the large air bubbles contribute more to the received signal, then the technique will give an estimated flow velocity equal to the velocity of the larger air bubbles and not the continuous phase. Therefore, the true limitation of the technique is that contrasting media moving at the velocity of the continuous phase can really only be used to estimate a flow velocity of the continuous phase.

If some of the contrasting media have the same velocity as the continuous phase and other contrasting media (also present in the flow) have different velocities, then errors are likely to occur. For example, consider the prior example of air bubbles entrained in a vertical flow, where in this case both small and large air bubbles are present. For very small air bubbles (microns in size) they are likely to move at the velocity of the continuous phase; but larger air bubbles will not. In situations where these large air bubbles contribute more to the received signal, then the technique will give an estimated flow velocity equal to the velocity of the larger air bubbles, which is likely not indicative of the flow of the continuous phase.

What are needed are cross-correlation methods that are sensitive to contrast media moving at the continuous phase flow velocity in a fluid flow in a vessel, such as a pipe or conduit, and corresponding systems to facilitate such methods. The methods should be performed and/or the systems should be able to be installed and used without requiring replacement of a section of the vessel. Additionally, the methods can preferably be performed and/or the systems can preferably be used without requiring substantial training of an operator. Further, the systems and methods should allow for characterization of the flow velocity of a fluid flow in spite of the potentially unpredictable composition and/or characteristics of the fluid flow, especially the noise created by the contrasting properties in the discontinuous phase.

U.S. Patent Application Publication 2013/0238260 describes an ultrasonic flow meter that measures a flow volume of a primarily single phase fluid by sending an ultrasonic signal to the fluid and receiving a transmission signal or a reflection signal obtained from the fluid. The received transmission signal can be used to determine a first flow volume while the reflection signal can be used to determine a second flow volume. The first flow volume or second flow volume can then be selected for output to the user based on a volume of air bubbles in the fluid, as determined by a correcting unit.

U.S. Patent Application Publication 2014/0096599 describes a method and apparatus for determining a flow rate of a fluid and detecting gas bubbles or particles in the fluid. The gas bubbles or particles are detected based on a collapse of an amplitude of an ultrasonic signal. The flow rate can be determined based on a travel time of the ultrasonic signal in the fluid. A plurality of transmitters and receivers can be used to allow for averaging of a plurality of determined flow rates in order to reduce errors in the flow rate determination.

U.S. Pat. No. 4,545,244 describes a method and apparatus for using a pair of transducers to determine a flow rate in a fluid. In some aspects, the transducers can be configured so that one is upstream relative to the other to allow for a measurement of flow rate based on both a Doppler shift and a time of propagation for an ultrasonic wave.

An article by R. Velmurugan et al. in the International Journal of Computer Applications (Vol. 66, No. 10, March 2013) describes an ultrasonic flow meter using a cross-correlation technique. Two pairs of ultrasonic transducers are used that operate at the same frequency. The signals transmitted through the fluid are detected and then correlated using a cross-correlation technique to determine the time shift between the detected signals that corresponds to the highest correlation. As noted in the journal article, clamp-on transducers are not preferred for this type of system. This is due to restrictions on the dynamic range of a clamp-on flow meter due to acoustic short circuits between the ultrasonic transmitters and demodulator. The journal article states that in a continuous wave cross-correlation meter, the sensors must be acoustically isolated from the pipe walls to eliminate the short-circuit effect, which usually excludes the use of a clamp-on arrangement. Additionally, clamp-on transducers also have difficulties due to the dependence of beam spacing and orientation on acoustic transmission through pipe walls, where imperfections distort and refract the beams.

An article, Worch., Meas. Sci. Technol. 9 (1998) 622-630, describes a clamp-on ultrasonic cross correlation flow meter for one-phase flow. The correlation technique presented offers a method measuring the average rate of flow of fluids through pipes using ultrasonic sensors, and transforming the natural, stochastic fluctuations of velocity, pressure and density into two signals with a delay time T, and a real-time correlator, extracting the delay time from the signals and calculating the average rate of flow of the fluid.

SUMMARY OF THE INVENTION

Systems and methods are provided herein related to making and/or refining velocity measurements for flowing fluids, both single and multi-phase fluids, in vessels, such as pipes or conduits, utilizing an improved cross-correlation method attuned to contrast media property agent variations.

In one aspect, this disclosure provides a method of determining a flow velocity of a fluid flow in a vessel comprising: providing a fluid flow having contrast media, the contrast media having a contrast media property variation; providing a detectable signal corresponding to the contrast media property variation; collecting the detectable signal at an upstream receiver to produce a first received signal; collecting the detectable signal at a downstream receiver to produce a second received signal, the downstream receiver being located downstream of the upstream receiver at a distance (L); filtering the first received signal and the second received signal through a contrast media variant filter to produce a first filtered signal and a second filtered signal; cross-correlating the first filtered signal and the second filtered signal to determine a time shift ($\Delta t$) between the first filtered signal and the second filtered signal; and estimating the velocity of the fluid flow using this relationship vflow=L/$\Delta t$.

In another aspect, this disclosure provides a method for estimating a flow velocity of a fluid flow in a vessel, comprising: providing a fluid flow having contrast media, the contrast media having a contrast media property variation; emitting a first signal with a first energy source, the first signal interacting with the contrast media to produce a first altered signal relating to the contrast media property variation; receiving the first altered signal at an upstream receiver positioned to be sensitive to signals from the first energy source that have interacted with the contrast agents; emitting a second signal with a second energy source, the second energy source being located downstream of the first signal at a known length (L), the second signal interacting with the contrast agents to produce a second altered signal related to the contrast media property variation; receiving the second altered signal at a downstream receiver located downstream of the upstream receiver and positioned to be sensitive to signals from the second energy source that have interacted with the contrast agents; filtering the first altered signal and the second altered signal through a contrast media variant filter to produce a first filtered signal and a second filtered signal; cross-correlating the first filtered signal with the second filtered signal to determine a time shift ($\Delta t$) between the first filtered signal and the second filtered signal that corresponds to the maximum correlation between the first filtered signal and the second filtered signal; and estimating the velocity of the fluid flow using this relationship $v_{flow}$=L/$\Delta t$.

In another aspect, this disclosure provides a method of determining a flow velocity of a fluid flow in a vessel comprising: providing a fluid flow in the vessel, the fluid flow having contrast media that produce a detectable signal in the fluid flow; providing a virtual receiver in the vessel, the virtual receiver having a virtual receiver property model; collecting the detectable signal at a downstream receiver to produce a first received signal, the downstream receiver being located downstream of the virtual receiver at a known distance (L); filtering the virtual receiver property model and the first received signal through a contrast media variant filter to produce a first filtered signal and a second filtered signal; correlating the first filtered signal and the second filtered signal to determine a time shift (Δt) between the first filtered signal and the second filtered signal; and estimating the velocity of the fluid flow using this relationship vflow=L/Δt.

In another aspect, this disclosure provides a method of estimating a flow velocity of a fluid flow in a vessel, comprising: providing a fluid flow in the vessel, the fluid flow having contrast media that produce a detectable signal; providing a virtual receiver in the vessel, the virtual receiver having a virtual receiver property model; emitting a first signal with a first energy source to produce a first altered signal corresponding to the contrast media, the first signal being downstream of the virtual receiver and interacting with the contrast media; detecting the first altered signal at a downstream receiver, the downstream receiver being located downstream of the virtual receiver and oriented to the first energy source; filtering the first altered signal and the virtual receiver property model through a contrast media variant filter to produce a first filtered signal and a second filtered signal; cross-correlating the first filtered signal with the second filtered signal to determine a time shift (Δt) between the first filtered signal and the second filtered signal that corresponds to the maximum correlation between the first filtered signal and the second filtered signal; and estimating the velocity of the fluid flow using this relationship vflow=L/Δt.

DETAILED DESCRIPTION OF THE INVENTION

Figure 1:
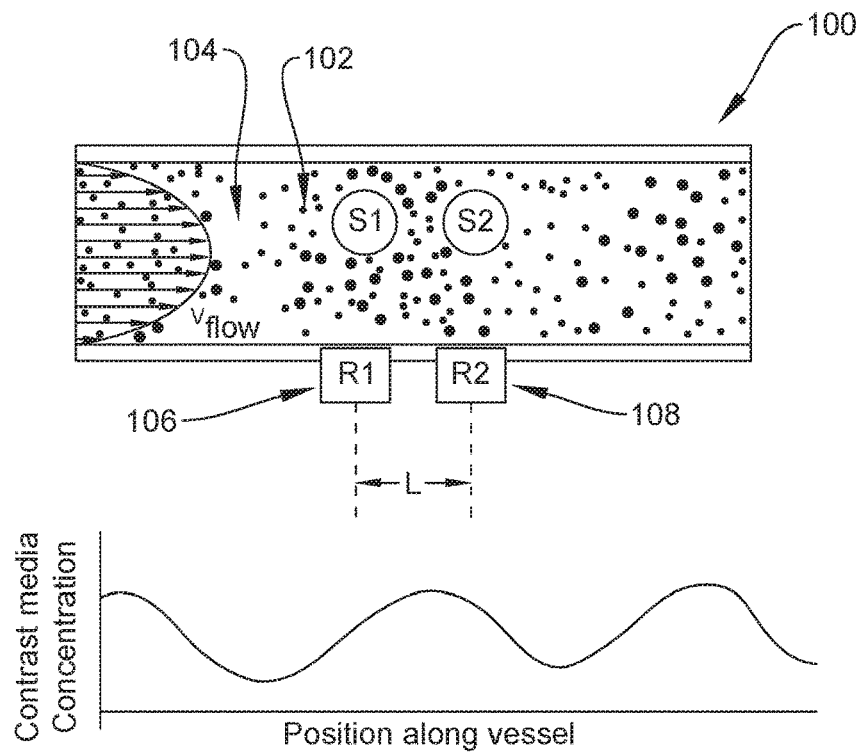
FIG. 1 is a generic representation of aspects of a method presented herein.

Systems and methods are provided herein related to making and/or refining velocity measurements for flowing fluids, both single and multi-phase fluids, in vessels, such as pipes or conduits, utilizing an improved cross-correlation method attuned to contrast media property agent variations.

Presented herein are methods for the purposes of measuring the continuous phase flow velocity of either a single phase or multi-phase fluid flow (referred to collectively herein as "fluid" or "fluids") in a vessel that overcome the shortcomings of traditional cross-correlation methodologies because these novel methods are sensitive to the velocity of the entrained contrast media, which in many cases are known to move at velocities that differ from the velocity of the fluid flow (e.g., the continuous phase of the fluid flow). One of the novel features of the methods presented herein is that these methods allow one to obtain a more accurate measure of the continuous phase flow velocity of a fluid through analyzing a primary contrast media moving at the continuous phase flow velocity of the fluid, even if other contrast media are present in the fluid and not moving at the continuous phase flow velocity. Thus, the methods presented herein are improvements to a traditional "cross-correlation" method.

In various aspects, the cross-correlation technique can be used to overcome the difficulties due to inconsistent time-varying response in a fluid flow. Instead of attempting to interpret a time-varying response of the flow, the changes in transmission as the signal passes through at least a portion of the fluid flow can be monitored. These changes in transmission can then be monitored under the assumption that, if the distance between the receivers is small enough, the fluid flow may not change substantially between the locations of the receivers. Under the assumptions that a similar composition and structure of the fluid flow and the entrained contrast media will produce a similar signal, and that the structure of the fluid flow (such as the position of contrast media/phases within the flow) does not change significantly between the locations of the receivers, the signals from the two receivers can be cross-correlated to determine the length of time required for a cross-section of the flow in the pipe to travel from the plane of the receiver pair to the plane of the second receiver pair. This cross-correlation can then be used to estimate velocity of the flow of the fluid.

Advantageously, in various aspects, these systems and methods allow for optimization of fluid flows in a variety of contexts including in an oil and gas context when monitoring flows from individual wells or different zones in a well. The systems and methods are non-intrusive and do not present operational stops in order to accommodate the systems and methods. In some aspects, the system described herein may be used with existing pipelines (e.g., without removal of a section of the pipe) to estimate flow velocity. Additionally, the contrast media utilized does not negatively impact the fluid flow by their inclusion in the flow.

In various aspects, systems and methods are provided herein for making and/or refining fluid flow measurements for flowing fluids in vessels, such as pipes or conduits, utilizing contrast media property variations through measurement of signals generated by those variations from at least two locations in the vessel. Such fluid flows or flowing fluids (either term is equivalent as used herein) include at least a continuous phase, a discontinuous phase, and one or more entrained contrast media.

Fluids involved in the methods described herein are single phase and/or multi-phase fluids that comprise suspended or dissolved materials ("contrast media").

Contrast media, as that term is used herein, refers to the primary contrasting media in a fluid flow whose size and other relevant properties are such that they move at the flow velocity of the continuous phase in a fluid flow, and their presence does not alter the nature of the continuous phase flow. These contrast media may be entrained within the fluid naturally or have been previously added to the fluid (e.g., through an injection method at an injection point). More than one type of contrasting media can be present within the fluid flow. Examples of contrast media include, but are not limited to, salts, microbubbles, radioactive particles, magnetic colloid particles, bubbles, solid particles, salts, a second immiscible liquid phase, liquid droplets, or other material inclusions that can be intentionally injected or exist naturally in the vessel and provide signal contrast with the flow, combinations thereof, and the like. In some embodiments, the contrast media may be degradable as long as they do not degrade upstream of the upstream emitter/receiver.

Suitable contrast media have variable spatio-temporal properties, herein referred to as contrast media property variations. These are time or spatially varying characteristics arising from the presence of the contrast media, either intrinsically or because the characteristic has been induced (e.g., by a source). In some instances, contrast media can emanate signals naturally, cause the scattering and/or attenuation of active sources, or create new signals upon interaction with a source to produce a detectable signal. When entrained in the fluid, the contrast media in the vicinity of the emitters and receivers modify the transmitted energy collected at the respective receivers in a manner that relates to the contrast media property variations. Essentially, any property of the contrasting agent whose variation can be detected in a signal by at least one upstream receiver may be used. Preferably, the variation is not destroyed upstream of the upstream receiver. We note that the variations need not be periodic in nature because the methods and systems disclosed herein are useful in cases where the known property variation is not periodic. When property variations are periodic, this approach is still valid but potentially less sensitive than averaging. The methods disclosed herein may include varying the spatial and temporal properties of the contrast media (especially as to their injection into the fluid) to create defined patterns in the received energy that can be extracted and used to estimate velocity of the fluid. One of the main considerations for choosing the contrast media is that the contrast media should have an appropriate density and size so that they do not become a third phase in the fluid. Additionally, the variation in the contrast media should be detectable by the receivers, and should not negatively influence or inhibit the flow of the fluid or alter the nature of the fluid.

The volume of contrast media to use in the methods and systems provided herein depends on many factors including, but not limited to, the detectability, fluid characteristics, size of the vessel, concentration for detectability, detectability, and the like. The detection of the variation should rise above the background noise that may be present due to components of the discontinuous phase in the fluid. A person of ordinary skill in the art with the benefit of this disclosure should recognize the volume needed to overcome the background noise created by elements in the fluid. One method to determine whether a sufficient volume of contrast media has been added is to perform a calibration experiment on the fluid to measure the noise.

Examples of Physical Receiver Methods

In some aspects, provided herein are methods of determining a flow velocity of a fluid flow in a vessel using two physical receivers.

An example of such a method provided herein for estimating a flow velocity of a fluid flow in a vessel, includes: providing a fluid flow having contrast media, the contrast media having a contrast media property variation; providing a detectable signal corresponding to the contrast media property variation; collecting the detectable signal at an upstream receiver to produce a first received signal; collecting the detectable signal at a downstream receiver to produce a second received signal, the downstream receiver being located downstream of the upstream receiver at a distance (L); filtering the first received signal and the second received signal through a contrast media variant filter (which is a set of mathematical or manipulative operations applied to a signal whose characteristics are chosen so as to enhance elements of a signal arising from a preferred contrast media property variation and/or suppress elements of a signal not arising from such a variation) to produce a first filtered signal and a second filtered signal; cross-correlating the first filtered signal and the second filtered signal to determine a time shift ($\Delta t$) between the first filtered signal and the second filtered signal; and estimating the velocity of the fluid flow using this relationship $v_{flow}=L/\Delta t$.

Reference to FIG. 1 helps explain this method. In FIG. 1, a vessel 100 is shown that contains a fluid 104 with entrained contrast media 102. The fluid 104 may be a single phase or a multiphase fluid that includes a continuous phase and one or more discontinuous phases. The terms first and second as used herein merely refer to the placement of the receivers relative to the vessel; more than two receivers may be used according to this disclosure.

The fluid contained within the vessel includes fluid-entrained contrast media either in vitro or injected upstream of the S1, the first signal. The contrast media may be injected into the fluid flow upstream of the upstream receiver in the flow; the injection may be done in a periodic fashion, in some instances. Injecting the contrast media may involve adding the contrast media to the fluid at a known injection rate upstream of the upstream receiver. Any suitable method for injecting the contrast media into the fluid can be used as long as the injection method does not prejudice or negatively affect the fluid flow or estimated velocity calculations. One example is an external body to the vessel that is pressurized that allows injection of the contrast media into the fluid through the use of valves. A tank with a hose is an example. The injection technique should preferably result in a known pattern of injection of the contrast media variation. The manner of injecting the contrast media should have a periodicity, but that does not have to be in the form of a mathematical function. For example, the injection does not need to correspond to a sinusoidal variation. It can be any periodic variation over a known time. This periodic injection concentration pattern can be examined over time relative to signals from emitters/receivers that are downstream of the injection point to determine the estimated velocity of the fluid in the vessel.

The contrast media may have a detectable signal (e.g., naturally) as a result of its property variation. In some instances, the contrast media may emit a detectable signal as a result of a coercion of the signal (e.g., through an external force), which may be periodic in nature. In some instances, the external force may involve the application of electromagnetic forces and/or acoustic forces; the external force may also be applied in a periodic fashion. In any event, the detectable signal may be due at least in part to a contrast media property variation. Examples of contrast media property variations include radioactivity, magnetic susceptibility, electric susceptibility, oscillatory concentration profiles, materials properties, different sizes, capacitance, acoustic impedance, mass, volume, magnetization, or any combination thereof.

The detectable signal can be detected and received at first receiver 106 and second receiver 108; note that the first receiver 106 is upstream of the second receiver 108, meaning of course that second receiver 108 is downstream of first receiver 106 at a distance "L" from the upstream first receiver 106. L is defined as the distance between the geometric center of the first receiver 106 and the second receiver 108 along a direction parallel to the fluid flow axis in the vessel. Although shown as a cylindrical vessel in FIG. 1, we note that the vessel need not be cylindrical or other axial symmetrical in nature. The vessel, preferably, should have sufficient symmetry, however, to allow the orientation between the first signal S1 and the upstream receiver 106 to be replicated in the orientation of the second signal S2 and downstream receiver 108.

The detectable signal from the contrast media is illustrated in FIG. 1 at S1 and again at S2. The first receiver 106 collects detectable signal S1 and the second receiver 108 collects detectable signal S2. Once collected, the signals are received signals. The received signals are then filtered using a contrast media variant filter to produce a first filtered signal and a second filtered signal. A contrast media variant filter, as that term is used herein, refers to a set of mathematical or manipulative operations applied to a signal whose characteristics are chosen so as to enhance elements of a signal arising from a preferred contrast media property variation and/or suppress elements of a signal not arising from such a variation. The first filtered signal and the second filtered signal are then cross-correlated to determine a time shift ($\Delta t$) between the first filtered signal and the second filtered signal. The velocity of the fluid flow can then be estimated using this relationship: $v_{flow}=L/\Delta t$.

An increase in the concentration of the contrast media relative to the location of upstream receiver may reduce the measured signal received by upstream receiver 106. A decrease in the concentration of the contrast media relative to upstream receiver 106, perhaps to a previous level detected. At some later point, the concentration of contrast media moves through the pipe to be relative to downstream receiver 108. At this point, the contrast media similarly affect the energy collected at downstream receiver 108 from the signal from downstream receiver 108 (Signal 2) in a manner that relates to the contrast media property variation.

Additionally, because the contrast media modify Signals 1 and 2 in a manner that relates to the contrast media property variation, Signals 1 and 2 thereby have common features. Because downstream receiver 108 is downstream of upstream receiver 106, certain features of Signal 1 are shifted to later times in Signal 2, due to the finite propagation of the entrained contrasting agents. By applying signal filters that are sensitive to the known contrast media property variation, these features can be extracted from Signals 1 and 2. The resulting filtered signal 1 and filtered signal 2 can be cross-correlated in time, where the time shift that produces the maximum correlation is "$\tau$". The time shift ti reflects the amount of time for the contrast media property variation to a travel a known distance L from upstream receiver 106 to downstream receiver 108, and because these contrast media are entrained with the flow, an estimate of the flow velocity is obtained from the relationship: $V_{est}=L/\tau$.

The signals collected by each receiver will be the sum of two contributions: the contrasting media already inherent in the flow will be recorded as a random-like signal while the coerced contrast media and/or the injected contrast media will be recorded as a periodic signal with a frequency set by $F_{imposed}$, which corresponds to the frequency imposed by the injection method or coercing method. The contrast media move at a velocity equal to the velocity of the continuous phase. Knowledge of how the contrast media was injected or the contrast media was coerced is used to filter the data to either suppress signals from the contrasting media already inherent in the flow or enhance the signal from the contrast medias or coerced contrast media. Ultimately, either filtering approach leads to filtered signals comprising a signal that mostly results from the movement of the contrast media or coerced contrast media with the continuous phase of the fluid. These filtered signals can now be analyzed using an improved "cross-correlation" technique, which is improved because these filtered signals will lead to a better estimate of the continuous phase flow velocity.

Again, referring to FIG. 1, it is important to note that the receivers need not be physically joined to the outside of the vessel. Depending on the orientation of the vessel, the receivers can be placed within the vessel, for example, by mounting the receivers to the interior of the vessel prior to introduction of the fluid. Alternatively, the receivers may be placed on a separate device that is then placed within the vessel or external to the vessel in such a way as to allow the receivers to perform as needed. In FIG. 1, upstream signal S1 and upstream receiver 106 are shown as opposed on the vessel, but other orientations are possible; nonetheless, it is important that downstream signal S2 and downstream receiver 108 have approximately the same relative orientation as upstream signal S1 to upstream receiver 106.

Increasing L by moving the receivers farther apart can help to isolate the signals received by the upstream and downstream receivers, but increasing the separation distance between the receivers carries a corresponding risk of increasing the likelihood that the structure of the fluid flow will change during the additional time required to travel the increased distance L between the receivers. Such changes in the structure of the fluid flow may arise from many effects, including, but not limited to, non-uniform laminar flow, turbulent mixing, gravitational or centrifugal separation, dissolution or precipitation of media, diffusion, etc.

The contrast media may be present in the fluid flow or injected into the fluid flow. If injected, injection of the contrast media into the fluid flow can be accomplished using any suitable technique. In some instances, to provide contrast media into a fluid flow for the purposes of the methods herein, contrast media can be injected into the fluid flow at an imposed frequency, for example, a periodic frequency of contrast media, wherein the concentration of the contrast media varies over one cycle, or a continuous frequency where the contrast media properties varies over one cycle. The receivers should be able to record signals from the contrast media corresponding to the imposed injection frequency ("$F_{imposed}$"). Other examples of injecting contrast agents include periodic injection of contrast agents, where the concentration of contrast agents vary over one cycle, or continuous injection where the contrast agents properties vary over one cycle.

Other methods disclosed herein involve the coercion of contrast media present in the fluid flow to produce a detectable signal. In such methods, the coercion is accomplished in such a manner that receivers are able to record signals that emanate from the contrast media at an imposed frequency ("$F_{imposed}$") imposed by the coercion method. In some instances, the contrast media may be coerced in such a manner that the receivers record oscillatory signals emanating from the contrast media at an imposed frequency (e.g., according to a periodic function). Examples of coercing contrast media inherent in the flow are using time varying electromagnetic or acoustic radiation forces to slow and speed up the contrast media with known periodicity.

In other aspects of the two physical receiver methods presented herein, a signal can be produced relative to the contrast media by actively inducing the signal from the contrast media through use of an energy source (e.g., electromagnetic, acoustic, thermal, or radiation.). An example of such a method provided herein for estimating a flow velocity of a fluid flow in a vessel, includes: providing a fluid flow having contrast media, the contrast media having a contrast media property variation; emitting a first signal with a first energy source, the first signal interacting with the contrast media to produce a first altered signal relating to the contrast media property variation; receiving the first altered signal at an upstream receiver positioned to be sensitive to signals from the first source that have interacted with the contrast medias; emitting a second signal with a second energy source, the second source being located downstream of the first signal at a known length (L), the second signal interacting with the contrast medias to produce a second altered signal related to the contrast media property variation; receiving the second altered signal at a downstream receiver located downstream of the upstream receiver and positioned to be sensitive to signals from the second source that have interacted with the contrast medias; filtering the first altered signal and the second altered signal through a contrast media variant filter to produce a first filtered signal and a second filtered signal; cross-correlating the first filtered signal with the second filtered signal to determine a time shift ($\Delta t$) between the first filtered signal and the second filtered signal that corresponds to the maximum correlation between the first filtered signal and the second filtered signal; and estimating the velocity of the fluid flow using this relationship $v_{flow}=L/\Delta t$.

In such methods, the contrast media property variation includes one selected from the group consisting of radioactivity, magnetic susceptibility, electric susceptibility, oscillatory concentration profiles, materials properties, different sizes, radioactivity, capacitance, acoustic impedance, mass, volume, magnetization, or any combination thereof. In some instances, the contrast media can be injected into the fluid flow as discussed above. In some instances, the contrast media property variation can be coerced as discussed above.

Figure 2:
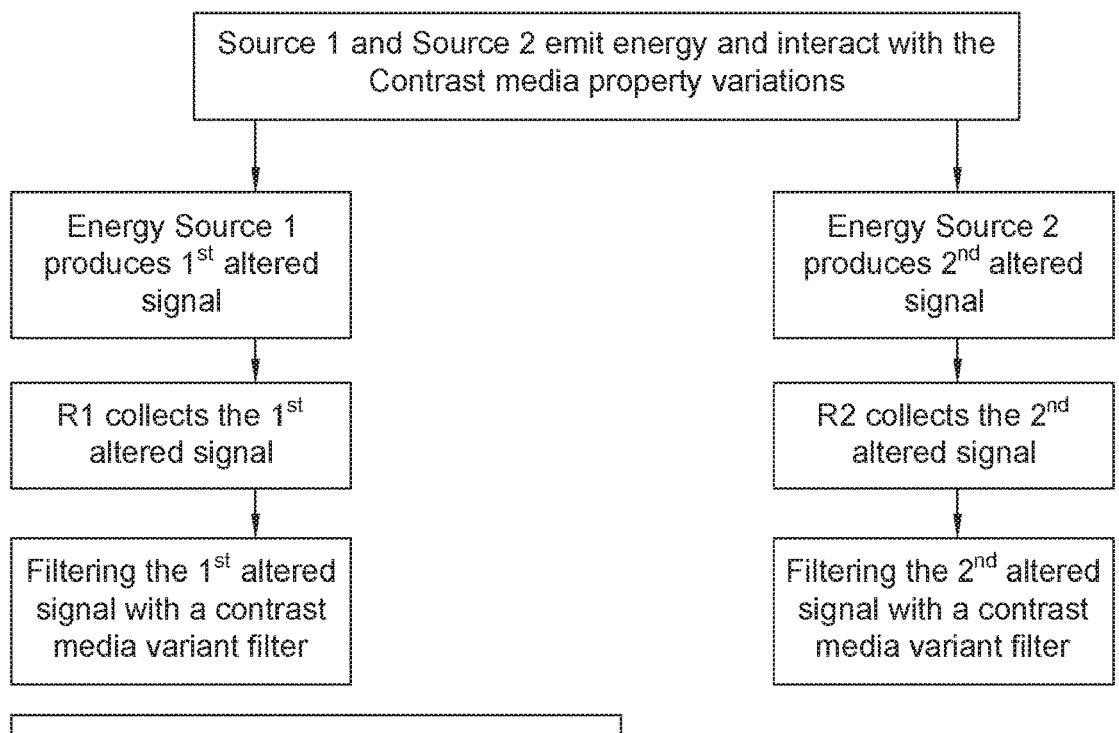
FIG. 2 is an example of a workflow process of a method described herein.

FIG. 2 illustrates a flow for this two physical receiver method wherein two energy sources are used. Energy is emitted from the first energy source and the second energy source and is scattered or absorbed by the contrast media. Energy sources can include electromagnetic, acoustic, thermal, or radiation sources. The contrast media have known contrast media property variations; these variations interact with the emitted energy from the energy sources to produce signals, which can correspond to any feature of the contrast media that can interact with the energy from the energy source to provide attenuation and/or scattering that differs from the interaction provided by the bulk flow of the continuous liquid phase. The contrast media thereby emit first altered signal and a second altered signal, respectively. The upstream signal S1 and the downstream signal S2 correspond to a variation in the contrast media that provides an attenuation and/or scattering that differs from the interaction provided by the bulk flow of the continuous liquid phase of the fluid flow. The upstream receiver and the downstream receiver are located at a known distance from the other; this known distance is referred to herein by the reference "L." Physical receivers R1 (upstream) and R2 (downstream) collect the altered signals as a first altered signal and a second altered signal, respectively. A contrast media variant filter is then applied to the first received signal and the second received signal to remove the noise from the measurements that may be attributable to components of the fluid flow. A first filtered signal and a second filtered signal result, respectively.

The first and second sources interact with the contrast media (e.g., the contrast media property variation) so as to produce altered signals that can be collected at the upstream and downstream receivers as described above. Preferably, the first and the second source interact with the contrast media in the same way so as to produce similar signals to be collected at the receivers. A contrast media variant filter is then applied to the first altered signal and the second altered signal to produce a first filtered signal and a second filtered signal as described above. The first filtered signal and the second filtered signal are then cross-correlated to determine the time shift that corresponds to the maximum correlation between the first filtered signal and the second filtered signal as described above. Velocity of the fluid flow is then estimated using this relationship $v_{flow}=L/\Delta t$.

In some aspects, the first energy source and/or the second energy source is mounted inside the vessel. In some aspects, the first receiver and/or the second receiver is mounted inside the vessel.

In some aspects the first energy source includes the energy source electromagnetic, acoustic, thermal, or radiation energy. In some aspects, the second energy source includes a different energy source than the first energy source.

Examples of Virtual and Physical Receiver Methods

In alternative aspects, a single receiver and a virtual receiver can be used in the methods disclosed herein. For example, where enough knowledge is known about the injection of the contrast media or coercion of the contrast media, then a physical model can be used to construct a virtual receiver (similar to an upstream receiver discussed above) at the point of injection or point of coercion, where the virtual receiver is the signal a receiver would have measured had a physical receiver been placed at the point of injection or point of coercion. Use of this "virtual receiver" can replace the upstream receiver, resulting in an implementation that only requires one physical receiver downstream of the virtual receiver. The cross-correlation technique can then be used relative to the injection/coercion point, i.e., the virtual receiver, and the single receiver.

An example of such a method provided herein for estimating a flow velocity of a fluid flow in a vessel, includes: providing a fluid flow in the vessel, the fluid flow having contrast media that produce a detectable signal in the fluid flow; providing a virtual receiver in the vessel, the virtual receiver having a virtual receiver property model; collecting the detectable signal at a downstream receiver to produce a first received signal, the downstream receiver being located downstream of the virtual receiver at a known distance (L); filtering the virtual receiver property model and the first received signal through a contrast media variant filter to produce a first filtered signal and a second filtered signal; correlating the first filtered signal and the second filtered signal to determine a time shift ($\Delta t$) between the first filtered signal and the second filtered signal; and estimating the velocity of the fluid flow using this relationship $v_{flow}=L/\Delta t$.

The virtual receiver can be the injection point for contrast media, which can be determined by the injection point and a physical model. Alternatively, the virtual receiver can be a coercion point where an external force (e.g., an external force applied according to a periodic function) is applied to contrast media within the fluid flow to coerce the contrast media into a spatial arrangement that results in a detectable and periodic signal from the contrast media. The virtual receiver property model is a physical set of equations intended to model and/or replicate the response of a physical receiver. In some instances, the virtual receiver is a coercion point at which an external force is applied to the fluid flow to coerce the detectable signal from the contrast media. In other instances, the virtual receiver is determined by injecting the contrast agents and a physical model.

In some instances, the detectable signal corresponds to a contrast media property variation such as radioactivity, magnetic susceptibility, electric susceptibility, oscillatory concentration profiles, materials properties, different sizes, capacitance, acoustic impedance, mass, volume, magnetization, or any combination thereof. In other instances, the detectable signal results from a coercion of the contrast media (e.g., by application of an external force to the contrast media). In some instances, the contrast media is injected into the fluid flow.

In some instances, the detectable signal corresponds to a coerced signal. In some aspects, at least one of the detectable signal, first altered signal, and the second altered signal is periodic with an imposed frequency.

An example of another method provided herein for estimating a flow velocity of a fluid flow in a vessel with a virtual receiver, a physical receiver, and active energy sources includes: providing a fluid flow in the vessel, the fluid flow having contrast media that produce a detectable signal; providing a virtual receiver in the vessel, the virtual receiver having a virtual receiver property model; emitting a first signal with a first energy source to produce a first altered signal corresponding to the contrast media, the first signal being downstream of the virtual receiver and interacting with the contrast media; detecting the first altered signal at a downstream receiver, the downstream receiver being located downstream of the virtual receiver and oriented to the first energy source; filtering the first altered signal and the virtual receiver property model through a contrast media variant filter to produce a first filtered signal and a second filtered signal; cross-correlating the first filtered signal with the second filtered signal to determine a time shift ($\Delta t$) between the first filtered signal and the second filtered signal that corresponds to the maximum correlation between the first filtered signal and the second filtered signal; and estimating the velocity of the fluid flow using this relationship $v_{flow}=L/\Delta t$.

EXAMPLES

Figure 3:
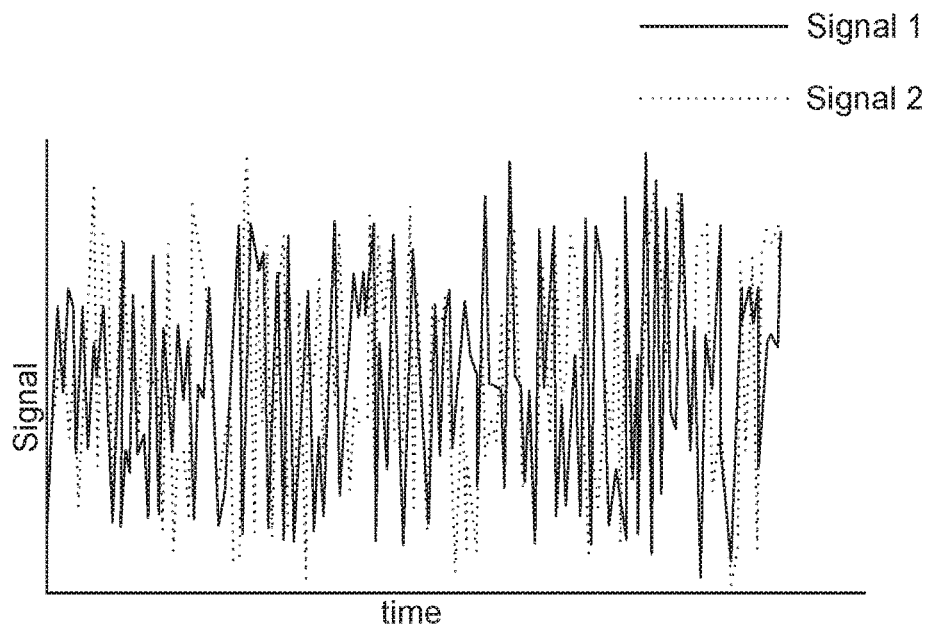
FIG. 3 is an illustrative figure showing signal intensities from R1 and R2.
Figure 4:
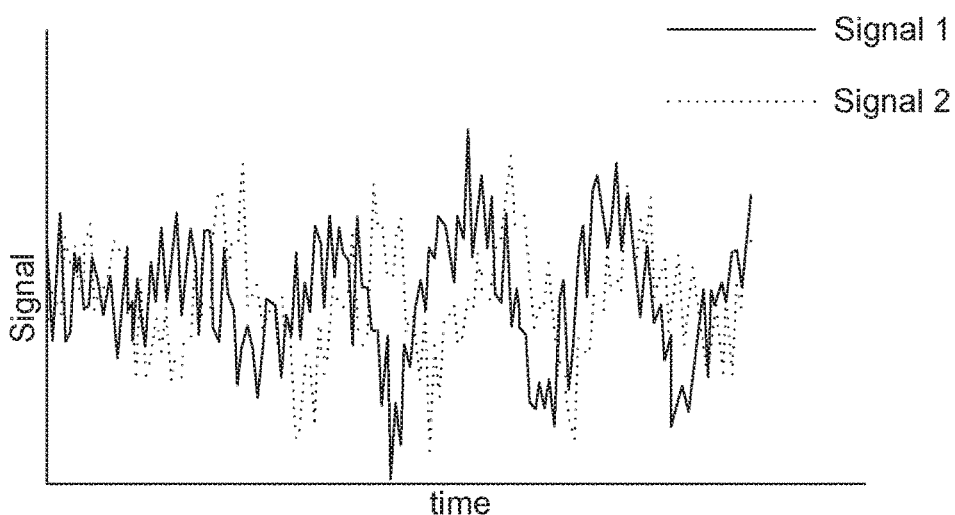
FIG. 4 is a filtered version of FIG. 3 using known contrast media property variations to filter signals.
Figure 5:
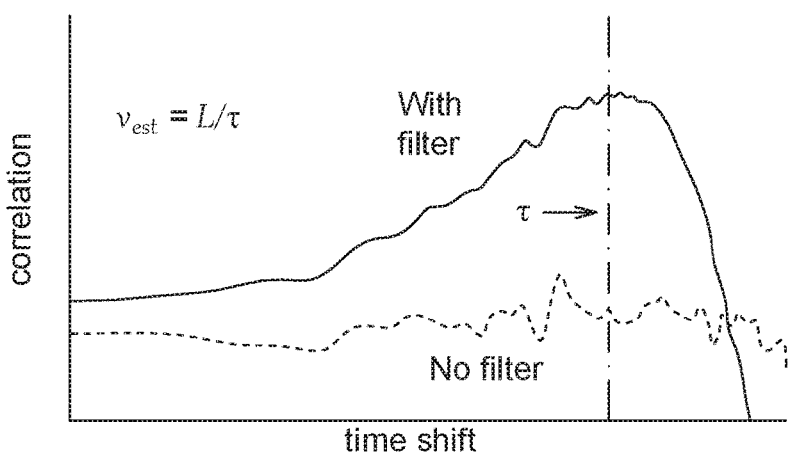
FIG. 5 is an illustration of the cross correlation between Signal 1 and Signal 2 with time shifting Signal 2 by the amount of the time shift, which maximizes the correlation (τ). The estimator for flow velocity is $V_{est}=L/\tau$.

FIGS. 3, 4 and 5 refer to a first example measurement and correlation.

Referring now to FIG. 3, shown in FIG. 3 illustrates intensities from upstream receiver R1 (signal 1) and downstream receiver R2 (signal 2). In this example, two types of contrast media are introduced into the fluid flow. The first type of contrast media has a spatially oscillating concentration ("proper"), while the second type of contrast media does not ("rogue"). The receivers are situated in this example as shown in FIG. 1, discussed above.

The measured signal shown in FIG. 3 comprises 3 parts: (1) the signal due to scattering and absorption from the "proper" contrasting agents, (2) additional signal due to scattering and absorption from the "rogue" contrast media with contrast media property variations other than oscillating concentration; and (3) random fluctuations to represent other sources of signal noise in the fluid. By filtering Signals 1 and 2, an estimate for the velocity of the contrast media with the imposed contrast media variation can be achieved. Standard methods exist to construct and apply filters with arbitrarily designed "kernels" (a kernel is a specific pattern one wishes to search for in the filter).

FIG. 4 shows Signals 1 and 2 of FIG. 3 filtered using the contrast media variant filter as a filter kernel. While some degree of noise remains in the resulting Filtered Signal 1 and Filtered Signal 2, it is apparent by visual inspection that the two data share similar features, but shifted in time (x-axis). The time shift ($\tau$) is shown in the vertical dashed line.

To obtain an estimate for velocity, a cross-correlation of the filtered signals shown in FIG. 4 is performed and illustrated in FIG. 5. FIG. 5 illustrates the results of cross-correlating the unfiltered signals versus the filtered versions of the intensities as a function of time shift ($\tau$). The dashed line in FIG. 5 is the unfiltered version of the signals discussed in FIG. 3; the solid line is the filtered version of the signals in FIG. 4.

The time shift ti that maximizes this correlation is an estimator for how much time it takes for the contrast media to move from the upstream receiver to the downstream receiver. As can be seen in FIG. 5, the unfiltered signal does not have a well-defined maximum, either because the noise is too large or the total set of proper and rogue contrast media do not have a well-defined velocity. However, the cross-correlation of the filtered signals does have a well-defined maximum because the noise and the rogue contrast media have effectively been removed from the correlation by the filtering process. This allows for a velocity estimator to be computed based on mathematical relationship: $V_{est}=L/\tau$.

FIGS. 6-10 refer to a second example measurement, which demonstrate intrinsic sources of noise that can be filtered out.

Figure 6:
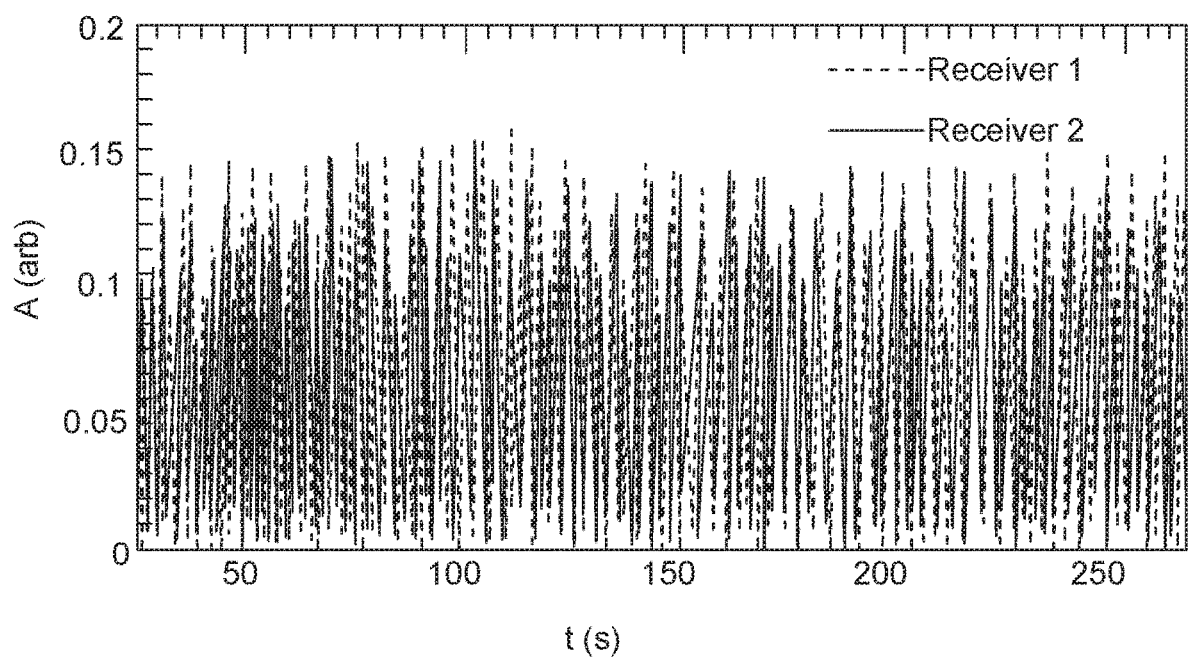
FIG. 6 illustrates raw signals from two measurement points in a fluid flow.

Referring to FIG. 6, FIG. 6 illustrates the raw signal data from two measurement points in a fluid flow experiment. This experiment involves two types of contrast media, specifically Species A and Species B, which are entrained in the fluid flowing through the vessel. Species A and Species B have characteristically different velocities. Species A is composed of micron-sized objects that move essentially with the speed of the fluid flow and do not interfere with the flow of the fluid. Species B, on the other hand, is composed on centimeter-sized objects that move significantly faster than the fluid flow. In order to estimate the fluid velocity, we have chosen to focus on the motion of Species A.

Species A is repeatedly injected into the fluid with a fixed frequency of approximately every seven seconds. The frequency is determined by observing the signal relative to the fluid flow so that the property observed goes back to background (e.g., through homogenization over time in the fluid). One thing to monitor is that the pattern for injection should be reproducible. This variation in concentration due to the injection pattern then serves as the known spatio-temporal property variation of the contrast media from which fluid flow information can be extracted.

Figure 7:
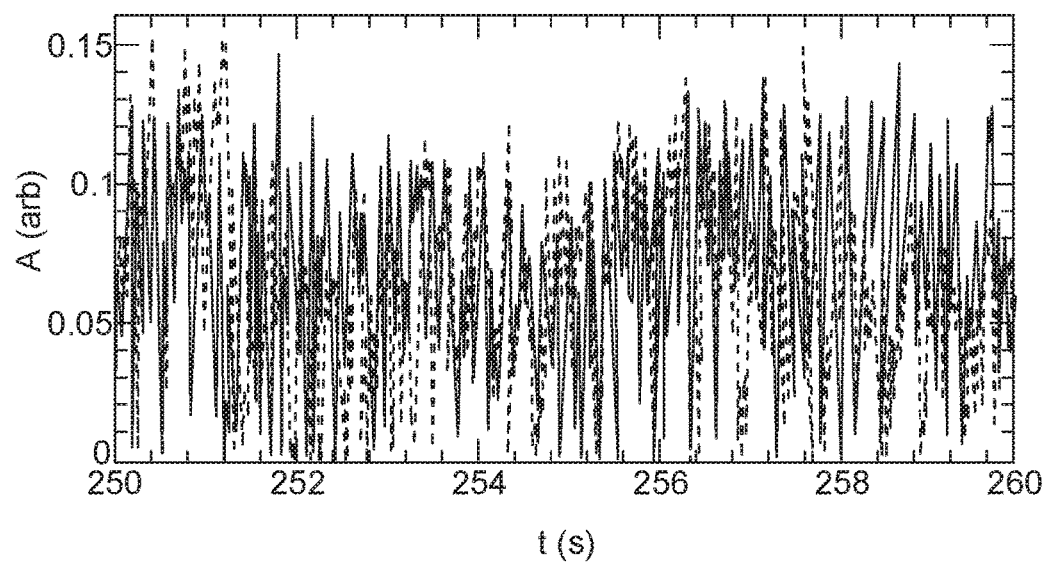
FIG. 7 is a close-up view of the same signals in FIG. 6.

FIG. 6 shows the raw signals captured at two receivers (e.g., upstream receiver R1 and downstream receiver R2) during the flow experiment. Receiver 1 is the dashed line; receiver 2 is the solid line. Qualitatively, signals show two important features: large, rapid fluctuations around a mean, and a noticeable periodic modulation. Large, rapid fluctuations in signal intensity are due to Species B being present and the periodic feature is due to the injection of Species A as described above. FIG. 7 shows a higher resolution view of the data in FIG. 6 wherein the receiver 1 and receiver 2 lines are more visible.

Figure 8:
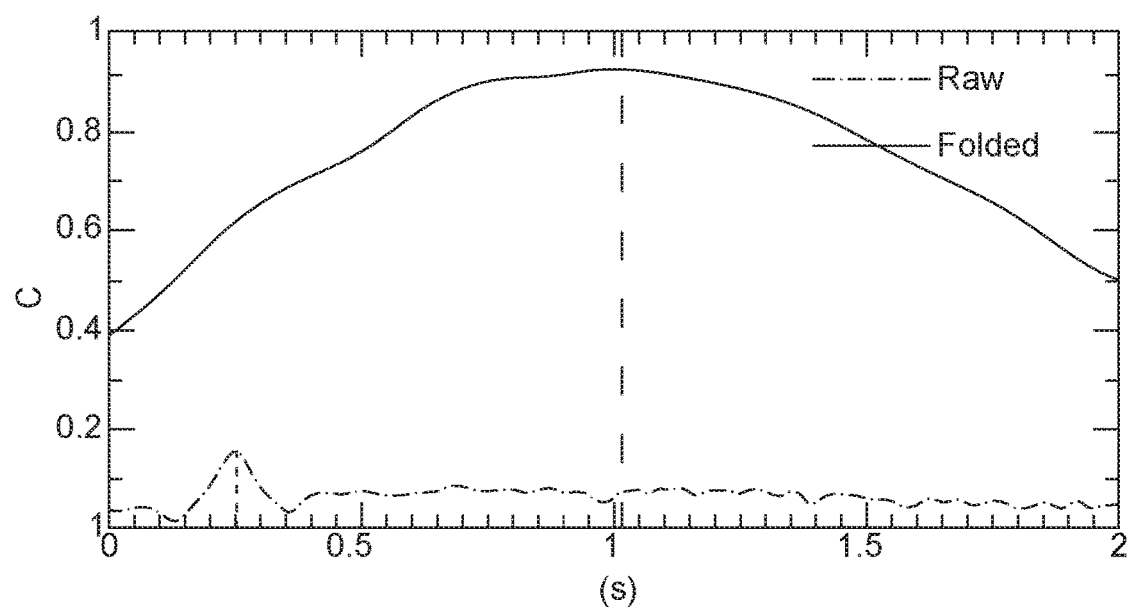
FIG. 8 illustrates the results of time-shift correlations of raw (blue) and folded (red) signals.

FIG. 8 illustrates the results of the time-shift correlation of the raw signals in FIG. 6. Though small, a peak is present in the correlation at 0.25 s, however this peak arises from the large fluctuations in the signals due to the motions of Species B.

Figure 9:
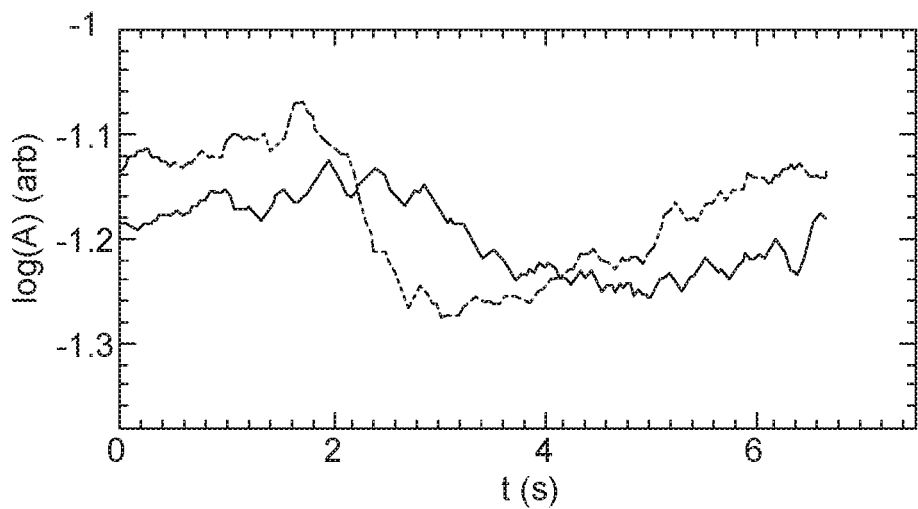
FIG. 9 illustrates the results of folding raw signals in FIG. 6 based on the known injection rate of species A.

FIG. 9 illustrates the results of folding raw signals in FIG. 6 based on the known injection rate of Species A contrast media.

Figure 10:
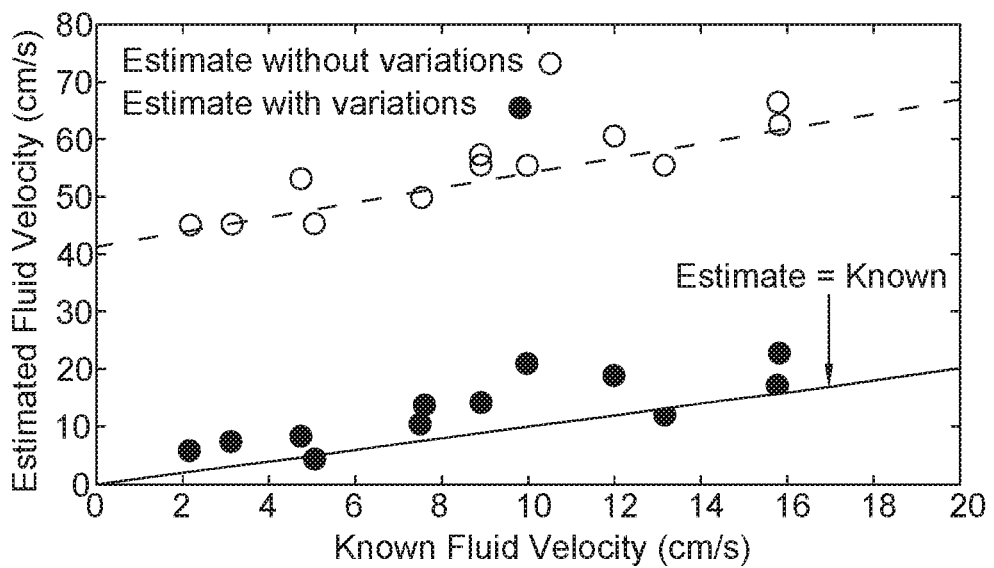
FIG. 10 illustrates estimates of velocity using time-shift correlation of raw signals versus refined estimates of velocity leveraging known spatio-temporal properties of the flow.

Using the procedures described above with fluid flow rates produces the estimates of velocity shown in FIG. 10. Here, we find that directly correlating the raw signals consistently over-estimates the known fluid flow velocity, shown as the solid line in FIG. 10.

ADDITIONAL EMBODIMENTS

Embodiment 1: In various aspects, the systems and methods provided herein include a method of determining a flow velocity of a fluid flow in a vessel comprising: providing a fluid flow having contrast media, the contrast media having a contrast media property variation; providing a detectable signal corresponding to the contrast media property variation; collecting the detectable signal at an upstream receiver to produce a first received signal; collecting the detectable signal at a downstream receiver to produce a second received signal, the downstream receiver being located downstream of the upstream receiver at a distance (L); filtering the first received signal and the second received signal through a contrast media variant filter to produce a first filtered signal and a second filtered signal; cross-correlating the first filtered signal and the second filtered signal to determine a time shift ($\Delta t$) between the first filtered signal and the second filtered signal; and estimating the velocity of the fluid flow using this relationship $v_{flow}=L/\Delta t$. Embodiment 2: The method of Embodiment 1, wherein the detectable signal results from the application of an external force to contrast agents within the fluid flow. Embodiment 3: The method of Embodiment 2 wherein the external force is applied according to a periodic function. Embodiment 4: The method of Embodiment 2 wherein the external force involves the application of electromagnetic forces and/or acoustic forces. Embodiment 5: The method of Embodiment 1 wherein the detectable signal results from a contrast media property variation. Embodiment 6: The method of Embodiment 1 wherein the contrast media property variation includes one selected from the group consisting of radioactivity, magnetic susceptibility, electric susceptibility, oscillatory concentration profiles, materials properties, different sizes, capacitance, acoustic impedance, mass, volume, magnetization, or any combination thereof. Embodiment 7: The method of Embodiment 1 wherein at least one of the detectable signal, the first received signal, and the second received signal is periodic. Embodiment 8: The method of Embodiment 1 further comprising the step of injecting contrast media into the fluid flow as part of providing a fluid flow with contrast media. Embodiment 9: The method of Embodiment 8 wherein the injecting step is performed according to a periodic function. Embodiment 10: The method of Embodiment 1 wherein the fluid flow comprises a continuous phase and one or more discontinuous phases.

Embodiment 11: A method for estimating a flow velocity of a fluid flow in a vessel, comprising: providing a fluid flow having contrast media, the contrast media having a contrast media property variation; emitting a first signal with a first energy source, the first signal interacting with the contrast media to produce a first altered signal relating to the contrast media property variation; receiving the first altered signal at an upstream receiver positioned to be sensitive to signals from the first energy source that have interacted with the contrast agents; emitting a second signal with a second energy source, the second energy source being located downstream of the first signal at a known length (L), the second signal interacting with the contrast agents to produce a second altered signal related to the contrast media property variation; receiving the second altered signal at a downstream receiver located downstream of the upstream receiver and positioned to be sensitive to signals from the second energy source that have interacted with the contrast agents; filtering the first altered signal and the second altered signal through a contrast media variant filter to produce a first filtered signal and a second filtered signal; cross-correlating the first filtered signal with the second filtered signal to determine a time shift ($\Delta t$) between the first filtered signal and the second filtered signal that corresponds to the maximum correlation between the first filtered signal and the second filtered signal; and estimating the velocity of the fluid flow using this relationship $v_{flow}=L/\Delta t$. Embodiment 12: the method of Embodiment 11 wherein the contrast media property variation includes one selected from the group consisting of radioactivity, magnetic susceptibility, electric susceptibility, oscillatory concentration profiles, materials properties, different sizes, radioactivity, capacitance, acoustic impedance, mass, volume, magnetization, or any combination thereof. Embodiment 13: the method of Embodiment 11 wherein at least one of the detectable signal, the first received signal, and the second received signal is periodic. Embodiment 14: the method of Embodiment 11 further comprising the step of injecting contrast media into the fluid flow as part of providing a fluid flow with contrast media. Embodiment 15: the method of Embodiment 14 wherein the injecting step is performed according to a periodic function. Embodiment 16: the method of Embodiment 11 wherein the contrast media has been injected into the fluid flow at an injection point. Embodiment 17: the method of Embodiment 11 wherein at least one of the detectable signal, first altered signal, and the second altered signal is periodic with an imposed frequency. Embodiment 18: the method of Embodiment 11 wherein the first receiver and/or the second receiver are mounted inside the vessel. Embodiment 19: The method of Embodiment 11 wherein the first energy source and/or the second energy source are mounted inside the vessel.

Embodiment 20: A method of determining a flow velocity of a fluid flow in a vessel comprising: providing a fluid flow in the vessel, the fluid flow having contrast media that produce a detectable signal in the fluid flow; providing a virtual receiver in the vessel, the virtual receiver having a virtual receiver property model; collecting the detectable signal at a downstream receiver to produce a first received signal, the downstream receiver being located downstream of the virtual receiver at a known distance (L); filtering the virtual receiver property model and the first received signal through a contrast media variant filter to produce a first filtered signal and a second filtered signal; correlating the first filtered signal and the second filtered signal to determine a time shift ($\Delta t$) between the first filtered signal and the second filtered signal; and estimating the velocity of the fluid flow using this relationship $v_{flow}=L/\Delta t$. Embodiment 21: The method of Embodiment 22 wherein the detectable signal corresponds to a contrast media property variation. Embodiment 22: The method of Embodiment 21 wherein the contrast media property variation includes one selected from the group consisting of radioactivity, magnetic susceptibility, electric susceptibility, oscillatory concentration profiles, materials properties, different sizes, capacitance, acoustic impedance, mass, volume, magnetization, or any combination thereof. Embodiment 23: The method of Embodiment 20 wherein the detectable signal and/or the first received signal are periodic. Embodiment 24: The method of Embodiment 20 wherein the virtual receiver is an injection point for contrast media. Embodiment 25: The method of Embodiment 22 further comprising injecting contrast media into the fluid flow in the vessel. Embodiment 26: The method of Embodiment 25 wherein the injecting is performed according to a periodic function. Embodiment 27: The method of Embodiment 20 wherein the virtual receiver is a coercion point where external forces are applied to contrast agents within the fluid flow to coerce the contrast agents into a spatial arrangement that results in a detectable and periodic signal from the contrast media. Embodiment 28: The method of Embodiment 27 wherein the external force is applied according to a periodic function. Embodiment 29: The method of Embodiment 20 wherein the location of the virtual receiver is determined by injecting the contrast agents and a physical model.

Embodiment 30: A method for estimating a flow velocity of a fluid flow in a vessel, comprising: providing a fluid flow in the vessel, the fluid flow having contrast media that produce a detectable signal; providing a virtual receiver in the vessel, the virtual receiver having a virtual receiver property model; emitting a first signal with a first energy source to produce a first altered signal corresponding to the contrast media, the first signal being downstream of the virtual receiver and interacting with the contrast media; detecting the first altered signal at a downstream receiver, the downstream receiver being located downstream of the virtual receiver and oriented to the first energy source; filtering the first altered signal and the virtual receiver property model through a contrast media variant filter to produce a first filtered signal and a second filtered signal; cross-correlating the first filtered signal with the second filtered signal to determine a time shift ($\Delta t$) between the first filtered signal and the second filtered signal that corresponds to the maximum correlation between the first filtered signal and the second filtered signal; and estimating the velocity of the fluid flow using this relationship $v_{flow}=L/\Delta t$. Embodiment 31: The method of Embodiment 30 wherein the detectable signal corresponds to a contrast media property variation. Embodiment 32: The method of Embodiment 31 wherein the contrast media property variation includes one selected from the group consisting of radioactivity, magnetic susceptibility, electrical susceptibility, oscillatory concentration profiles, materials properties, different sizes, radioactivity, capacitance, acoustic impedance, mass, volume, magnetization, or any combination thereof. Embodiment 33: The method of Embodiment 30 wherein the detectable signal and/or the first altered signal are periodic. Embodiment 34: The method of Embodiment 30 wherein the virtual receiver is an injection point for contrast media. Embodiment 35: The method of Embodiment 30 further comprising injecting contrast media into the fluid flow in the vessel. Embodiment 36: The method of Embodiment 30 wherein the virtual receiver is a coercion point at which an external force is applied to the fluid flow to coerce the detectable signal from the contrast media. Embodiment 37: The method of Embodiment 36 wherein the external force is applied according to a periodic function. Embodiment 38: The method of Embodiment 30 wherein the location of the virtual receiver is determined by injecting the contrast agents and a physical model. Embodiment 39: The method of Embodiment 30 wherein at least one of the first receiver and/or the second receiver is mounted within a vessel. Embodiment 40: The method of Embodiment 30 wherein the first energy source is mounted inside the vessel.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in the art in light of the above detailed description. All such obvious variations are within the full intended scope of the appended claims.

What is claimed is:

1. A method of determining a flow velocity of a fluid flow in a vessel comprising:
   providing a fluid flow having contrast media therein, the fluid flow having a known periodicity, the contrast media having a contrast media property variation;
   providing a detectable signal having a defined pattern corresponding to the known periodicity and the contrast media property variation;
   collecting the detectable signal at an upstream receiver to produce a first received signal;
   collecting the detectable signal at a downstream receiver to produce a second received signal, the downstream receiver being located downstream of the upstream receiver at a distance (L);
   filtering the first received signal and the second received signal through a contrast media variant filter to produce a first filtered signal and a second filtered signal;
   cross-correlating the first filtered signal and the second filtered signal to determine a time shift ($\Delta t$) between the first filtered signal and the second filtered signal; and
   estimating the velocity of the fluid flow using a relationship $v_{flow}=L/\Delta t$.

2. The method of claim 1, wherein the detectable signal results from the application of an external force to contrast agents within the fluid flow.

3. The method of claim 2, wherein the external force is applied according to a periodic function.

4. The method of claim 2, wherein the external force involves the application of electromagnetic forces and/or acoustic forces.

5. The method of claim 1, wherein the detectable signal results from a contrast media property variation.

6. The method of claim 5, wherein the contrast media property variation includes one selected from the group consisting of magnetic susceptibility, electric susceptibility, oscillatory concentration profiles, different sizes, capacitance, mass, volume, magnetization, or any combination thereof.

7. The method of claim 1, further comprising injecting contrast media into the fluid flow as part of providing a fluid flow with contrast media.

8. The method of claim 1, wherein the fluid flow comprises a continuous phase and one or more discontinuous phases.

9. The method of claim 1, wherein the known periodicity is sinusoidal.

10. The method of claim 1, wherein the relationship comprises a defined maximum.

11. A method for estimating a flow velocity of a fluid flow in a vessel, comprising:
- providing a fluid flow having contrast media therein, the contrast media having a contrast media property variation;
- emitting a first signal with a first energy source at a known periodicity, the first signal interacting with the contrast media to produce a first altered signal relating to the contrast media property variation, the first altered signal having a defined pattern;
- receiving the first altered signal at an upstream receiver positioned to be sensitive to signals from the first energy source that have interacted with the contrast agents;
- emitting a second signal with a second energy source at the known periodicity, the second energy source being located downstream of the first signal at a known length (L), the second signal interacting with the contrast agents to produce a second altered signal related to the contrast media property variation, the second altered signal having the defined pattern;
- receiving the second altered signal at a downstream receiver located downstream of the upstream receiver and positioned to be sensitive to signals from the second energy source that have interacted with the contrast agents;
- filtering the first altered signal and the second altered signal through a contrast media variant filter to produce a first filtered signal and a second filtered signal;
- cross-correlating the first filtered signal with the second filtered signal to determine a time shift ($\Delta t$) between the first filtered signal and the second filtered signal that corresponds to a maximum correlation between the first filtered signal and the second filtered signal; and
- estimating the velocity of the fluid flow using a relationship $v_{flow}=L/\Delta t$.

12. The method of claim 11, wherein the contrast media property variation includes one selected from the group consisting of magnetic susceptibility, electric susceptibility, oscillatory concentration profiles, different sizes, radioactivity, capacitance, mass, volume, magnetization, or any combination thereof.

13. The method of claim 11, wherein at least one of the detectable signal, the first received signal, and the second received signal is periodic.

14. The method of claim 11, further comprising injecting contrast media into the fluid flow as part of providing a fluid flow with contrast media.

15. The method of claim 14, wherein the injecting is performed according to a periodic function.

16. The method of claim 11, wherein the contrast media has been injected into the fluid flow at an injection point.

17. The method of claim 11, wherein the first receiver and/or the second receiver are mounted inside the vessel.

18. The method of claim 11, wherein the first energy source and/or the second energy source are mounted inside the vessel.

19. The method of claim 11, wherein the energy source is electromagnetic, acoustic, thermal, or radiation.

20. The method of claim 11, wherein the known periodicity is sinusoidal.

21. The method of claim 11, wherein the relationship comprises a defined maximum.

22. The method of claim 11, wherein the first altered signal is an oscillatory signal and the second altered signal is an oscillatory signal.

* * * * *